Feb. 8, 1927.
A. S. KROTZ
1,616,581
AGRICULTURAL IMPLEMENT
Filed Jan. 30, 1920
2 Sheets-Sheet 1
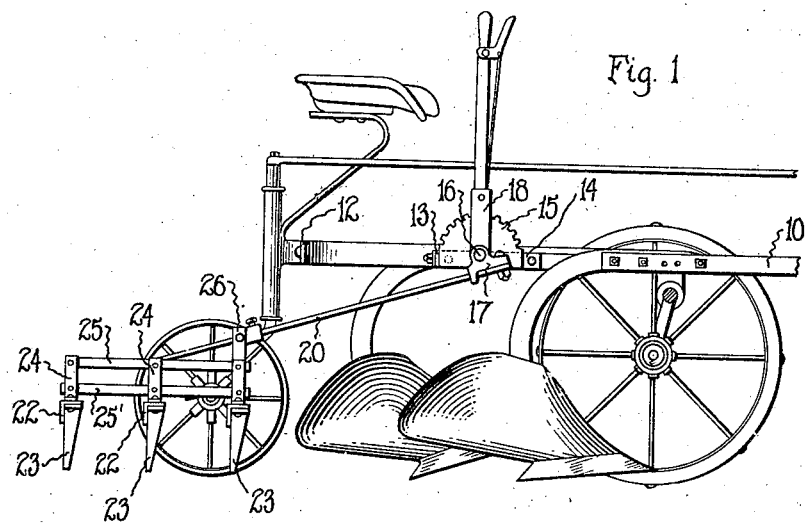
Fig. 1
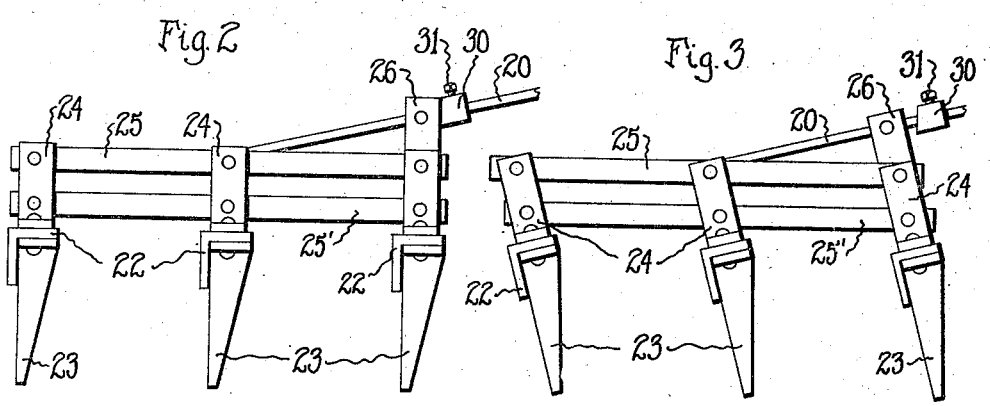
Fig. 2
Fig. 3
Inventor
Alvaro S. Krotz.
By Attorneys
Blackmore, Spencer & Flint.

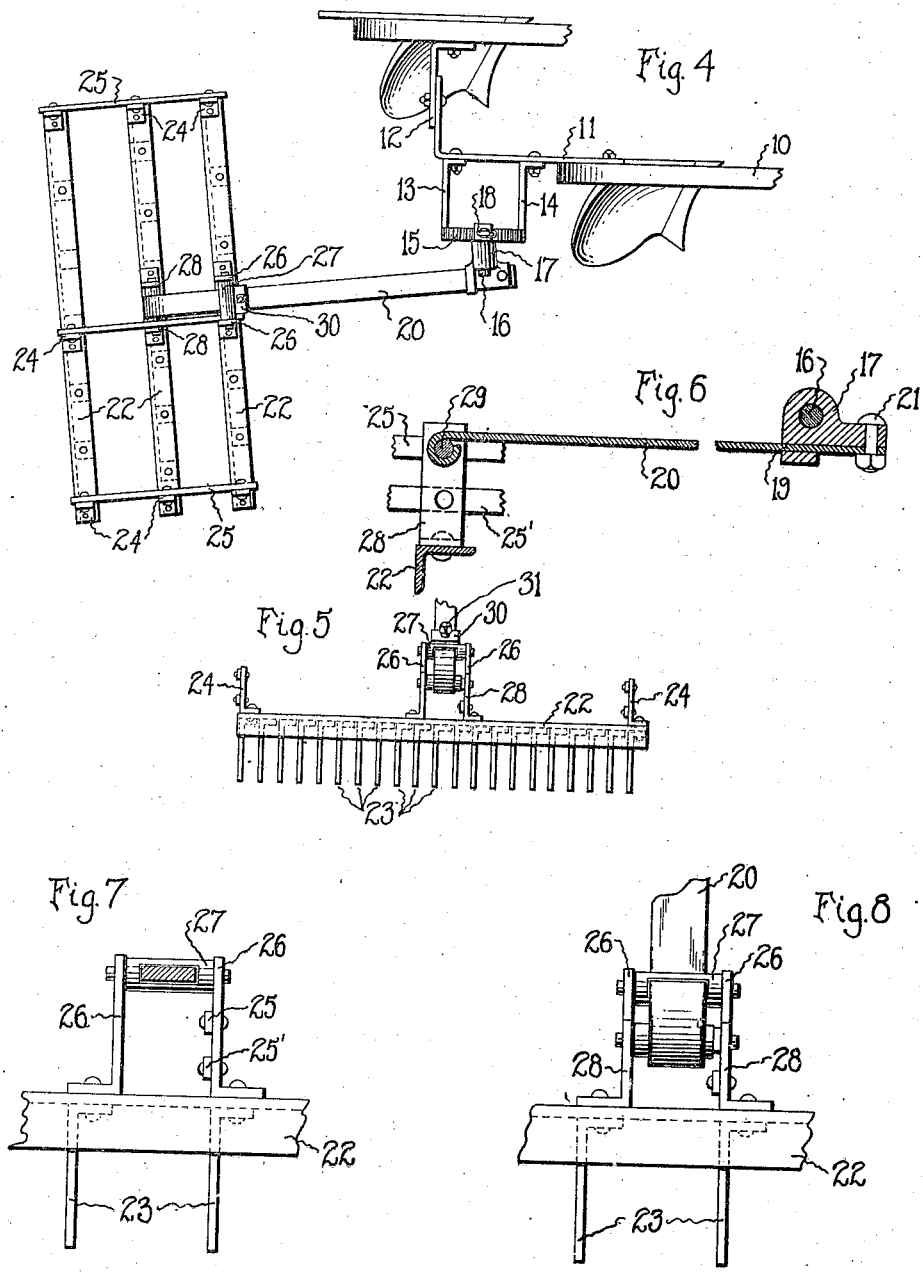

Patented Feb. 8, 1927.

1,616,581

UNITED STATES PATENT OFFICE.

ALVARO S. KROTZ, OF JANESVILLE, WISCONSIN, ASSIGNOR TO GENERAL MOTORS CORPORATION, OF DETROIT, MICHIGAN, A CORPORATION OF DELAWARE.

AGRICULTURAL IMPLEMENT.

Application filed January 30, 1920. Serial No. 355,078.

My invention relates to an attachment for agricultural implements and more particularly to a harrow adapted for attachment to a plow whereby the soil may be broken up and leveled immediately after it has been turned by the plow. Such devices are already known and they afford the obvious advantages of treating the soil before it has been dried by exposure to the air, thereby obviating the formation of clods and of performing two operations simultaneously, thereby economizing in time and labor.

The primary object of my invention is to improve the construction of devices of this class and to provide a harrow attachment which shall be simple in form and inexpensive in manufacture and at the same time highly efficient in operation.

In the accompanying drawings in which is illustrated one embodiment of my invention:

Fig. 1 is a side elevation of a plow equipped with a harrow attachment.

Fig. 2 is a side elevation of the harrow proper.
Fig. 3 is a view similar to Fig. 2, but showing the position of the teeth when the plow is being backed.

Fig. 4 is a plan view of the harrow attached to a plow frame.
Fig. 5 is a rear elevation of the harrow showing the arrangement of the teeth, Fig. 6 is a detail view showing the spring bar which carries the harrow, and Figs. 7 and 8 are detail views of the means for connecting the harrow to the spring bar.

In the drawings, 10 designates the frame of a plow which may be, as illustrated, a riding gang plow. A further description of the plow is deemed unnecessary, since my invention is in no way concerned with the specific character of the plow further than the necessity of providing some suitable means for mounting the harrow attachment upon the implement frame. In the form illustrated I have provided brackets 11, 12, consisting of flat bars bent as may be necessary, and bolted or otherwise secured to appropriate parts of the frame. These brackets afford a support upon which may be mounted, as by supplemental brackets 13, 14, a notched segment 15, carrying a stud 16. Upon this stud is journaled a block 17 integrally or otherwise rigidly connected to a lever 18 adapted to be set at any desired position by co-operation of an ordinary detent with the notched segment 15. The block 17 is provided with a slot 19 through which extends one end of a flat spring bar 20, the end of the bar being secured to the block by bolt 21.

The harrow proper comprises a plurality of frame members 22, formed preferably of angle bars to which are secured, as by rivets, the harrow teeth 23. These teeth consist of pieces of flat bar, tapered somewhat at the lower end, as shown, and bent at right angles at the upper end to provide a flat head to seat upon the angle-bar frame members 22. The harrow comprises three of the frame members, and the teeth are attached thereto in staggered relationship so as to be approximately equally spaced transversely to the direction of travel, as shown in Fig. 5.

To the upper sides of the frame members 22 are rigidly secured standards 24 to which upper and lower links 25, 25' are pivotally attached, thereby providing a parallel linkage connection between the frame members. By this connection I insure that the harrow teeth shall always remain parallel to each other while permitting variations in their inclination relative to the ground surface.

On one of the frame members 22, preferably the forward one, I mount two standards 26, longer than the standards 24, one of these standards 26 serving, however, as a means of support for one pair of links 25, 25'. At the upper ends of standards 26 is pivotally supported a slotted trunnion bar 27, through the slot of which the spring bar 20 extends loosely. On another of the frame members, preferably the middle one, I mount a pair of standards 28 which may be individually identical with standards 24, and to one of which the pair of links 25, 25', secured to standard 26, may also be secured. At the upper ends of standards 28 is mounted a pin or bolt 29 around which the rear end of spring bar 20 is bent to form a pivotal support for the said bar. Upon the bar 20, forwardly of this trunnion bar 27, is a stop block 30 which may be secured in any desired position on the bar 20 by means of set screw 31.

The position of the stop block 30 determines the inclination of the teeth in the normal operation of the harrow, inasmuch as the drag on the teeth will tend to distort the frame in such manner as to cause trunnion bar 27 to slide forwardly on spring bar 20 until said trunnion bar engages with the stop block. When the plow, or other frame structure to which the harrow may be attached, is caused to move in a rearward direction as frequently happens in operation, the teeth are free to assume a rearward inclination as shown in Fig. 3, and thereby tend to slide over the surface, offering no material resistance to the backward movement.

The pressure exerted to force the teeth into the ground is readily determined by the adjustment of the lever 18, thus raising or depressing the bar 20. This pressure will be exerted in a yielding manner since the bar is in the nature of a spring. The use of this spring bar not only serves to exert a yielding downward pressure on the teeth but also permits a certain extent of lateral movement under resilient restraint and also allows the harrow to tilt and otherwise conform in its position to irregularities in the surface over which it may operate.

Attention may be called to the fact that the harrow I have devised is constructed almost entirely of parts which may be readily shaped from commercial forms of bar iron thereby enabling the device to be manufactured at low cost while still affording a high degree of strength and durability.

While I have herein described a harrow attached to a plow frame it will be understood by those skilled in the art that in some phases of the invention it is not necessarily limited to an implement of the harrow type, nor to the use of the attachment in connection with a plow. The spring supporting means above described may, of course, be utilized for the support of other earth-working implements, as a clod crusher or cultivator. It is also clear that, instead of attaching the implement to a plow frame, it may be attached, either singly or in gangs, to some other form of agricultural implement, or to a frame, wheeled or not, as desired, designed merely to carry the attachment, and used for cultivating or harrowing purposes only.

It will also be understood that various modifications and variations in details of construction may be made without departing from the spirit and scope of the invention, and therefore I do not wish to be limited to the specific structure above described.

I claim:

1. The combination of an implement frame, and a harrow, means for supporting said harrow from said frame adapted to draw said harrow forwardly when the frame moves in a forward direction and to force said harrow rearwardly when the frame moves in a rearward direction, said harrow comprising a series of teeth and means for maintaining said teeth at desired angles relative to the ground surface, said means adapted to permit said teeth automatically to assume a rearward inclination when the harrow is moved rearwardly.

2. The combination of an implement frame, and a harrow, means for supporting said harrow from said frame adapted to draw said harrow forwardly when the frame moves in a forward direction and to force said harrow rearwardly when the frame moves in a rearward direction, said harrow comprising frame members pivotally connected, teeth mounted upon said frame members and means for adjusting the angular relation of said teeth to the ground surface, said means adapted to permit said teeth to be inclined rearwardly as a result of backward movement of said harrow.

3. A harrow comprising frame members, teeth secured to said frame members, means pivotally connecting said frame members and providing for simultaneous adjustment of the inclination of said teeth, and a bar for drawing said harrow, said bar pivotally attached to said frame members at one point and having slidable connection therewith at another point.

4. A harrow comprising frame members, teeth secured to said frame members, means pivotally connected to said frame members and permitting movement of said members to adjust the inclination of the teeth, a bar for drawing said harrow, said bar pivotally connected to said frame at one point and having slidable connection therewith at another point, and adjustable means on said bar for limiting the sliding movement, and thereby determining the inclination of said teeth.

5. The combination with a plow comprising a frame, of a spring bar, means for supporting said bar for pivotal movement on said frame, a harrow attached to said bar provided with teeth adapted to assume different inclinations and means on said bar to determine the inclination of said teeth, said means adapted to permit said teeth to be inclined rearwardly as a result of backward movement of said harrow.

6. The combination of a frame, a bar connected thereto, and a harrow, said harrow comprising a plurality of frame members, teeth secured thereon, standards mounted upon said frame members, links pivotally connecting said standards for parallel motion, said bar pivotally connected to said frame members at one point and having free sliding connection therewith at another point, and a stop on said bar to limit movement of said parts in one direction.

7. The combination with a plow and a bar secured thereto of a harrow comprising frame members connected to said bar and arranged to be moved, either forwardly or rearwardly by said bar in accordance with the direction of movement of the plow, means pivotally connecting said frame members adapted to maintain said teeth in parallel relation, and means limiting the pivotal movement of said members to determine the working inclination of said teeth, said means permitting free movement to give said teeth a rearward inclination when the plow is moved rearwardly.

8. The combination with an implement frame of a bar connected to said frame, a harrow frame connected to said bar, said harrow frame comprising angle bars, and harrow teeth depending therefrom, said teeth being formed of flat bars with flat heads bent at right angles to the tooth portion, said heads seated in the angle of the angle bars and engaging both flanges thereof and secured in such position.

In testimony whereof I affix my signature.

ALVARO S. KROTZ.